United States Patent
Simper et al.

(10) Patent No.: US 8,390,972 B2
(45) Date of Patent: Mar. 5, 2013

(54) SECONDARY PROTECTION APPROACH FOR POWER SWITCHING APPLICATIONS

(75) Inventors: Norbert J. Simper, Bissingen (DE); Martin Bach, Harburg (DE)

(73) Assignee: Hamilton Sundstrand Corporation, Rockford, IL (US)

( * ) Notice: Subject to any disclaimer, the term of this patent is extended or adjusted under 35 U.S.C. 154(b) by 1600 days.

(21) Appl. No.: 11/736,096

(22) Filed: Apr. 17, 2007

(65) Prior Publication Data
US 2008/0259914 A1 Oct. 23, 2008

(51) Int. Cl.
*H02H 3/08* (2006.01)
(52) U.S. Cl. ........................................................ 361/93.1
(58) Field of Classification Search ................... 361/93.1
See application file for complete search history.

(56) References Cited

U.S. PATENT DOCUMENTS

| | | | |
|---|---|---|---|
| 3,390,275 A | 6/1968 | Baker | |
| 3,876,942 A | 4/1975 | Koster et al. | |
| 4,742,425 A * | 5/1988 | Conzelmann et al. | 361/104 |
| 4,977,332 A | 12/1990 | White | |
| 5,045,734 A | 9/1991 | Mehl | |
| 5,416,686 A * | 5/1995 | Azuma et al. | 363/37 |
| 5,499,186 A * | 3/1996 | Carosa | 363/132 |
| 5,541,495 A | 7/1996 | Gali | |
| 5,666,278 A | 9/1997 | Ng et al. | |
| 5,859,772 A * | 1/1999 | Hilpert | 363/56.03 |
| 6,211,633 B1 | 4/2001 | Jones et al. | |
| 6,765,776 B2 | 7/2004 | Kelwaski | |
| 7,274,336 B2 * | 9/2007 | Carson | 343/705 |
| 7,432,756 B2 * | 10/2008 | Boe | 327/534 |
| 2002/0093062 A1 * | 7/2002 | Eden et al. | 257/401 |
| 2003/0141918 A1 * | 7/2003 | Uno | 327/309 |
| 2003/0202304 A1 | 10/2003 | Canova et al. | |
| 2005/0077878 A1 | 4/2005 | Carrier et al. | |
| 2005/0286200 A1 * | 12/2005 | Ohshima | 361/160 |

FOREIGN PATENT DOCUMENTS

| | | | |
|---|---|---|---|
| EP | 86252 A | * | 8/1983 |
| JP | 08279745 A | * | 10/1996 |
| WO | WO 0135432 A1 | * | 5/2001 |

* cited by examiner

*Primary Examiner* — Rexford Barnie
*Assistant Examiner* — Ann Hoang
(74) *Attorney, Agent, or Firm* — Carlson, Gaskey & Olds PC

(57) ABSTRACT

An apparatus and method for providing a primary and a secondary protection to a load in a power switching application uses an electronic circuit breaker to selectively permit a flow of current from an input to a load. The circuit breaker comprises a plurality of first switches coupled in parallel, and a plurality of fuses coupled to the plurality of first switches. In a disclosed embodiment, each first switch is coupled to a first fuse and to a second fuse. A controller opens and closes the plurality of first switches by commanding a driver current ON and OFF. The controller is operable to detect a fault condition and to open the plurality of first switches in response to the fault condition by commanding the driver current OFF. If the controller fails to open one of the first switches, one of the fuses coupled to the switch is operable to blow. In addition, the circuit breaker also comprises a charge pump that provides an electric current to a second plurality of switches to prevent the second plurality of switches form shorting the driver current.

21 Claims, 2 Drawing Sheets

SECONDARY PROTECTION APPROACH FOR POWER SWITCHING APPLICATIONS

BACKGROUND OF THE INVENTION

This application relates generally to vehicle power systems, and more particularly, to power switching applications.

Vehicles, such as aircraft, typically have a primary power source that is used to provide power to various other vehicle systems. In the event of a fault condition, such as an electrical current exceeding a threshold, it is necessary to protect the various vehicle systems from the fault condition.

An electronic circuit breaker can be used to selectively control a distribution of power to various vehicle systems, and also to protect a vehicle system from a fault condition.

A switch or a plurality of switches can be used in an electronic circuit breaker to provide a switching function and to act as a primary protection from a fault condition. However, in the event of a switch failure, a circuit breaker may no longer be able to protect a vehicle system from a fault condition.

There is a need for a secondary protection for an electronic circuit breaker for use in vehicle power switching applications.

SUMMARY OF THE INVENTION

A circuit breaker comprises a plurality of first switches coupled in parallel and a plurality of fuses coupled to the plurality of first switches. In a disclosed embodiment, each first switch is coupled to a first fuse and a second fuse. A controller is operable to detect a fault condition and to open the plurality of first switches in response to the fault condition using a driver current. A first fuse and a second fuse coupled to a first switch are operable to blow if the controller fails to open the first switch associated with the first fuse and the second fuse. The circuit breaker also comprises a charge pump that provides a charge pump current to a plurality of second switches to prevent the plurality of second switches from shorting the driver current. If the charge pump stops providing the charge pump current, at least one of the plurality of second switches shorts the driver current, turning the circuit breaker OFF.

These and other features of the present invention can be best understood from the following specification and drawings, the following of which is a brief description.

DETAILED DESCRIPTION OF THE PREFERRED EMBODIMENT

Figure 1:
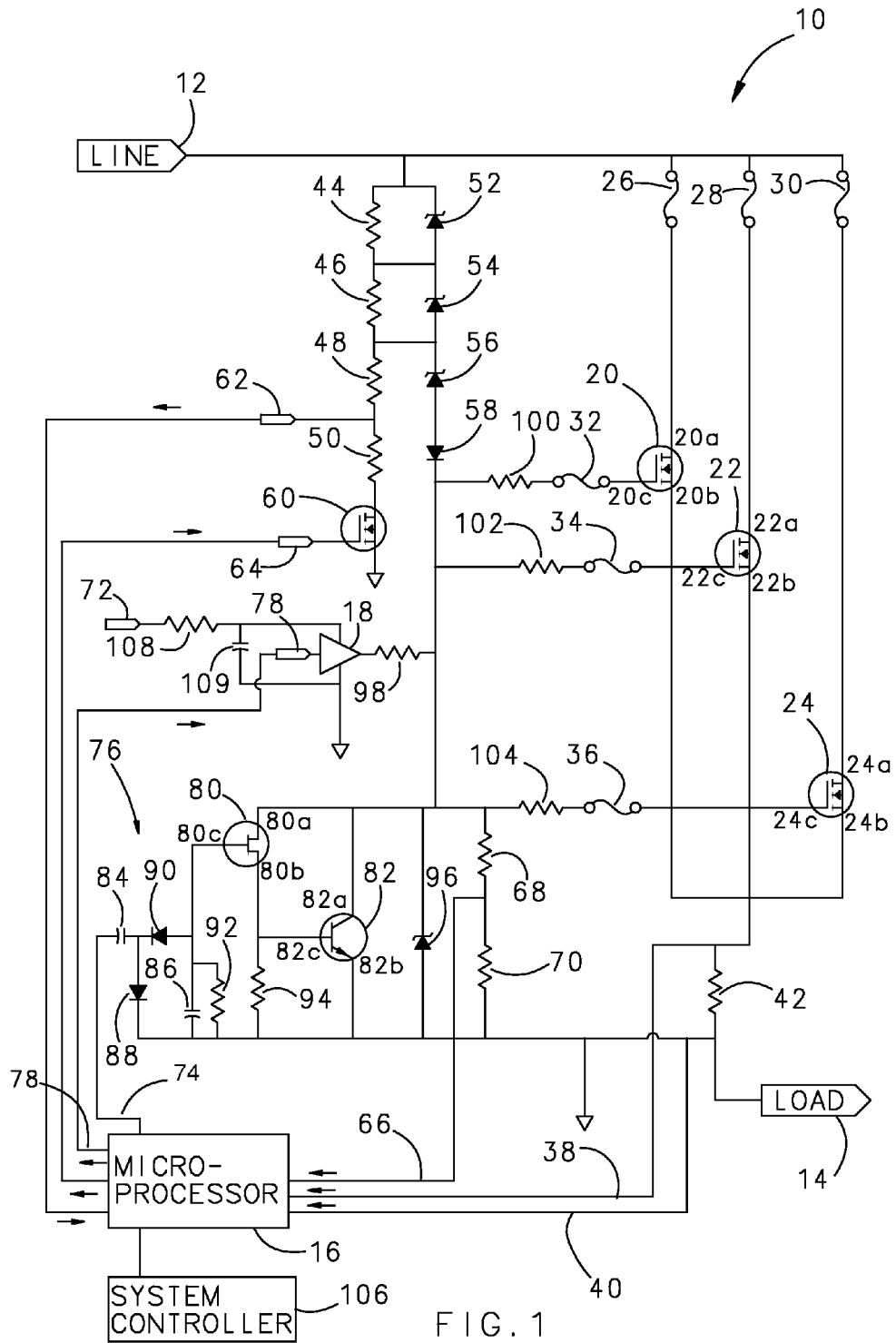
FIG. 1 schematically illustrates an electronic circuit breaker according to one embodiment of the present invention.

As shown in FIG. 1, an electronic circuit breaker 10 selectively controls a flow of current from a DC input voltage 12 to a load 14. In one example, the electronic circuit breaker 10 is a solid state power controller for use in a vehicle, such as an aircraft. It is understood, however, that the electronic circuit breaker 10 can be used in a variety of other applications.

A microprocessor 16 controls a driver 18 which provides a driver current to selectively turn a plurality of first switches 20, 22, and 24 ON and OFF. A plurality of first fuses 26, 28, and 30 are coupled to inputs 20a, 22a, and 24a of the first switches 20, 22, and 24. A plurality of second fuses 32, 34, and 36 are coupled to control inputs 20c, 22c, and 24c of the first switches 20, 22, and 24. While the example embodiment in FIG. 1 only has three first switches 20, 22 and 24, it is understood that other quantities of first switches could be used, and that any additional first switches might also be coupled to at least one fuse and could be coupled to the other first switches in parallel.

When the microprocessor 16 detects a fault condition, such as a current that exceeds a threshold, also known as an "overcurrent" condition, it commands the first switches 20, 22, and 24 OFF. By turning OFF and preventing current from flowing to the load 14, the switches 20, 22, and 24 provide a primary protection to the load 14.

Each of the first switches 20, 22, and 24 has an input (20a, 22a, and 24a), an output (20b, 22b, and 24b), and a control input (20c, 22c, and 24c). In one example the first switches 20, 22, and 24 are MOSFETs, and each input 20a, 22a, and 24a is a MOSFET drain, and each output 20b, 22b, and 24b is a MOSFET source, and each control input 20c, 22c, and 24c is a MOSFET gate. In another example, the first switches 20, 22, and 24 are IGBTs.

During normal operation, if the first switches 20, 22, and 24 are ON, an equal amount of current will flow through each of the first switches, which are connected in parallel. If one of the first switches fails to turn OFF, the plurality of first fuses 26, 28, 30 provide a secondary protection. For example, if all first switches are commanded OFF, but only switches 20 and 22 turn OFF and switch 24 remains ON, all current will flow through switch 24. This could happen if the switch 24 failed to turn off, or if the input 24a was shorted to the output 24b. In this case, the increased flow of current through fuse 30 would exceed a threshold, and fuse 30 would blow and prevent additional current from flowing through first switch 24 to the load 14. In this example, the fuse 30 provides secondary protection.

In another example, one of the control inputs 20c, 22c, or 24c is shorted to its associated input 20a, 22a, or 24a. In this example the plurality of second fuses 32, 34, or 36 provide a secondary protection by blowing if a current flowing through the second fuses exceeds a threshold. In one example, the plurality of first and second fuses 26, 28, 30, 32, 34, and 36 are made of a specially sized and constructed bond wire that melts if coupled to a current that exceeds a threshold. The specific amount of time it takes for the bond wire to melt depends on the magnitude of the current that exceeds the threshold. However it is understood that the plurality of first fuses and second fuses could be made of other materials.

The microprocessor 16 uses a plurality of inputs 38, 40, 62 and 66 to detect a fault condition and to monitor the electronic circuit breaker 10. The microprocessor 16 also communicates with a system controller 106 to send and receive data and instructions. The microprocessor 16 uses inputs 38 and 40 to measure a voltage drop across a current sensing resistor 42. The microprocessor 16 can use this voltage measurement to determine the magnitude of an output current flowing to the load 14. If the output current exceeds a threshold, the microprocessor 16 commands the first switches 20, 22, and 24 OFF.

The microprocessor can also measure an input voltage and an input current to the electronic circuit breaker 10. One example where it is useful to detect an input voltage or current is when the electronic circuit breaker 10 is in an OFF state, and no current flows to the current sensing resistor 42. In this scenario, the current sensing resistor 42 cannot be used to measure an output voltage or an output current.

To measure an input voltage, microprocessor 16 uses resistors 44, 46, 48, and 50 as a first voltage divider. Resistors 44, 46, and 48 collectively act as a first resistor in this first voltage divider, and resistor 50 acts as a second resistor. The microprocessor 16 uses output 64 to turn on a switch 60 which shorts the resistor 50 to ground. Then the microprocessor 16 uses input 62 to measure an input voltage. This voltage measurement enables the microprocessor 16 to determine the magnitude of an input voltage and an input current to the electronic circuit breaker 10. When not measuring the input voltage, the microprocessor 16 uses output 64 to turn the switch 60 OFF so that resistor 50 is no longer shorted to ground, and the first voltage divider comprising resistors 44, 46, 48, and 50 is no longer active.

The microprocessor 16 can also detect an input current to the control inputs 20c, 22c, and 24c of the first switches 20, 22, and 24. The microprocessor 16 uses an input 66 coupled to a second voltage divider comprising a first resistor 68 and a second resistor 70. This enables the microprocessor 16 to measure an input voltage and an input current to the control inputs 20c, 22c, and 24c of the first switches 20, 22, and 24.

The microprocessor 16 controls the driver 18 to selectively turn the first switches 20, 22, and 24 ON and OFF. The driver 18 amplifies an internal supply voltage 72 to provide an electric current to the first switches 20, 22, and 24. In one example the internal supply voltage 72 is a 10 volt DC voltage. Of course, other voltages may be used. The driver control 78 is an output from microprocessor 16 that turns the driver 18 ON or OFF. The driver 18 performs an amplifying function, as it amplifies the internal supply voltage 72 to a driver output voltage that is greater than the input voltage 72. In one example, the driver 18 is an operational amplifier.

When sufficient voltage is present at the control inputs 20c, 22c, and 24c, the first switches 20, 22, and 24 turn ON. When no voltage or insufficient voltage is present at the control inputs 20c, 22c, and 24c, the first switches 20, 22, and 24 turn OFF. If the increased driver output voltage mentioned above facilitates a voltage at the control inputs 20c, 22c, and 24c of sufficient magnitude, each of the first switches 20, 22, and 24 turn ON. When the driver 18 is OFF, the plurality of first switches are also OFF. A resistor 98 is coupled to an output of the driver to keep the driver current applied to the control inputs 20c, 22c, and 24c at a moderate level.

The microprocessor 16 also controls a charge pump 76 that enables the driver 18 to turn the first switches 20, 22, and 24 ON. The charge pump includes a second plurality of switches 80 and 82, capacitors 84 and 86, diodes 88 and 90, and resistors 92 and 94. Inputs 80a and 82a of the second plurality of switches 80 and 82 are coupled to the driver current. An output 80b of the switch 80 is coupled to a control input 82c of the switch 82. In one example the switch 80 is a JFET and switch 82 is a transistor, and the input 80a is a JFET drain, the output 80b is a JFET source, the control input 80c is a JFET gate, the input 82a is a transistor collector, the output 82b is a transistor emitter, and the control input 82c is a transistor base.

The microprocessor 16 has a square wave output signal 74 that controls the charge pump 76. If the square wave output signal 74 is OFF, then the charge pump 76 is OFF and the switch 80 is ON. When the switch 80 is ON, the driver current flows from the driver 18 through the switch 80 to a control input 82c of the switch 82, turning the switch 82 ON. When the switch 82 is ON, the driver current flows from the driver 18 through the switch 82 to ground. Thus, if the square wave output signal 74 is OFF, the driver current is shorted to ground by the switch 82, and the plurality of first switches 20, 22, and 24 remain OFF.

If the microprocessor 16 determines it should turn the first switches 20, 22, and 24 OFF, it turns the driver 18 and the charge pump 76 OFF. Additionally, the charge pump 76 provides additional protection if the driver 18 fails to stop providing a driver current to the first switches 20, 22, and 24, because even if the driver 18 is producing a driver current, if the charge pump 76 is OFF then the driver current will be shorted and the first switches 20, 22, and 24 will be turned OFF.

When the square wave output signal 74 is ON, current flows to the capacitor 84. From the capacitor 84 current flows through a diode 88 to ground and to a diode 90. The diode 90 is oriented to only permit a flow of positive current towards the capacitor 84, and to prevent a positive flow of current away from the capacitor 84. However, this orientation does allow a flow of negative current away from the capacitor 84 to a capacitor 86. The capacitor 86 stores this negative charge and transmits the negative charge to the control input 80c of the switch 80, which turns the switch 80 OFF, and prevents the switch 82 from shorting the driver current to ground. Thus, when the charge pump 76 is ON, the driver current can flow to the control inputs 20c, 22c, and 24c without being shorted to ground.

A resistor 92 is coupled in parallel to the capacitor 86. If the charge pump 76 turns OFF, the resistor 92 provides a path to ground to get a stored voltage out of the capacitor 86. A resistor 94 is coupled to the output 80b and to the control input 82c. If the charge pump 76 turns OFF, the resistor 94 ensures that the switch 82 is able to turn off by providing a path to ground for the control input 82c.

Diodes 52, 54, 56, and 58 perform a clamping function in the electronic circuit breaker 10. A typical diode is biased to only permit a flow of current in one direction. A zener diode initially permits a flow of current only in a first direction, however if sufficient voltage is supplied to a zener diode, it may permit a flow of current in a second direction that is opposite the first direction. In the example shown in FIG. 1, diodes 52, 54, and 56 are zener diodes, and diodes 58, 88, and 90 are regular diodes.

It is common in an aircraft application to work with an inductive load. If power is turned off to an inductive load, such as the load 14, it is possible to receive a high inductive kick back. An aircraft is an example environment where it is possible to receive a high inductive kick back, because in an aircraft a ground connection is typically really a "neutral" connection, due to the fact that when an aircraft flies it is not in contact with an earth ground connection. A neutral connection is connected to other components in an aircraft, and therefore an inductive load 14 has the potential to provide an inductive kickback to its own input 12 and to provide a voltage spike at an input of a switch.

The first switches 20, 22, and 24 are rated for specific voltages, and a high inductive kick back or a voltage spike could potentially damage the first switches 20, 22, and 24. The diodes 52, 54, and 56 are zener diodes oriented to only permit a flow of current in a first direction away from the first switches 20, 22, and 24. However if an input voltage increases to a certain level, the diodes 52, 54, and 56 become conductive and permit a flow of current in a second direction opposite the first direction towards the control inputs 20c, 22c, and 24c to turn the first switches 20, 22, and 24 ON to limit a voltage drop across the first switches 20, 22, and 24 and to prevent damage of the first switches 20, 22, and 24.

An additional zener diode 96 is coupled to the driver current and to ground, and is oriented to only permit a flow of current in a first direction towards the control inputs 20c, 22c, and 24c. The zener diode 96 is, however, operable to conduct current in a second direction opposite the first direction to ground a voltage spike or an excessive current at the control inputs 20c, 22c, and 24c. If for some reason one of the second fuses 32, 24, or 36 failed to blow, the zener diode 96 ensures that a voltage at the control inputs 20c, 22c, and 24c does not increase beyond a maximum voltage that the first switches 20, 22, and 24 can handle.

A plurality of resistors 100, 102, and 104 perform a decoupling function to prevent the first switches 20, 22, and 24 from oscillating due to an input capacitance of the diodes 52, 54, 56, and 58.

A resistor 108 limits a flow of current from the internal supply voltage 72 to the driver 18. A capacitor 109 acts as a filter for the driver 18, so that when the driver 18 is switched ON or OFF the driver current does not disturb the switch 82.

Additionally, the microprocessor can use the input 62 to determine if the diodes 52, 54, and 56 have failed. For example, if diode 52 fails and is for some reason shorted, then the resistor 44 would also be shorted. This would affect the data from the first voltage driver as measured by input 62. Thus, the microprocessor 16 is able to detect a variation in voltage from the first voltage divider to determine if one of the diodes 52, 54, or 56 has failed.

Figure 2:
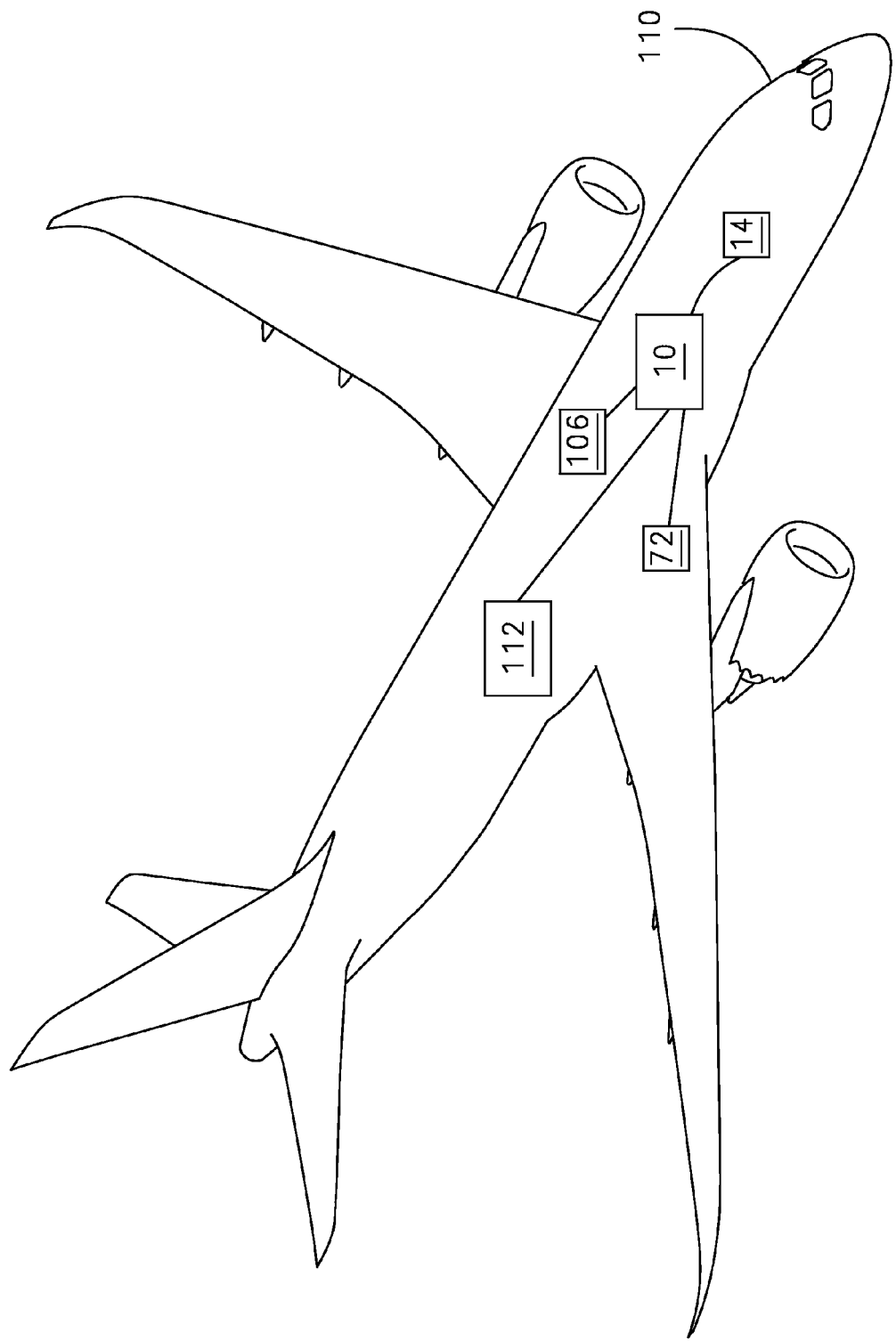
FIG. 2 schematically shows the electronic circuit breaker of FIG. 1 in an example environment of an aircraft.

As shown in FIG. 2, an aircraft 110 contains an electronic circuit breaker 10 that connects a DC input voltage 12 to a load 14. The electronic circuit breaker 10 is coupled to an internal supply voltage 72. The electronic circuit breaker communicates with a system controller 106 to send and receive data and instructions.

It is understood that although the example electronic circuit breaker 10 of FIG. 1 is configured for a DC application, it would be possible for one of ordinary skill in the art to adapt the electronic circuit breaker 10 to an AC application.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An electronic system for providing power to a load, comprising:
   a plurality of first switches providing parallel paths from a power source to the load and being operable to control a flow of current from the power source to the load, each of the first switches having an input, an output, and a gate;
   a controller, wherein the controller is operable to detect a fault condition and to turn OFF the plurality of first switches to prevent the flow of current from the power source to the load in response to the detected fault condition;
   a plurality of first fuses, each first fuse being coupled to an input of an associated one of the plurality of first switches, each of the plurality of first fuses being operable to prevent a flow of current from the power source to the input of its associated switch if a current flowing to the input of its associated switch exceeds a first fuse current threshold; and
   a plurality of second fuses, each second fuse being coupled to a gate of an associated one of the plurality of first switches, each of the second plurality of fuses being operable to prevent a flow of current to the gate of its associated switch if the current flowing to the gate of its associated switch exceeds a second fuse current threshold.

2. The system of claim 1, wherein the current flowing to the input of the associated switch exceeds the first fuse current threshold in response to the input of the switch being shorted to the output of the switch.

3. The system of claim 1, wherein the current flowing to the gate of one of the plurality of first switches exceeds a second fuse current threshold in response to the gate of the switch being shorted to the input of the switch.

4. The system of claim 1, wherein each of the plurality of first switches is a MOSFET.

5. The system of claim 1, further comprising:
   a driver that provides a driver current to selectively turn the plurality of first switches ON and OFF; and
   a charge pump that provides a charge pump current to a second plurality of switches to prevent the second plurality of switches from shorting the driver current, wherein the driver and the charge pump are operated by the controller.

6. The system of claim 5, wherein the second plurality of switches comprises a first switch and a second switch, and an output of the first switch is coupled to a control input of the second switch.

7. The system of claim 6, wherein each of the plurality of first switches are JFETs and the second plurality of switches are transistors.

8. The system of claim 6, wherein the driver amplifies a driver input voltage to provide a driver output voltage that is greater than the driver input voltage, and wherein the driver output voltage is coupled to the control input of each of the plurality of first switches to provide the driver current.

9. The system of claim 1, wherein the load is a component on an aircraft.

10. The system of claim 1, wherein each of the plurality of fuses comprises a bond wire specifically sized and constructed to provide a required fusing characteristic.

11. The system of claim 1, including at least one zener diode oriented to block a flow of current from the power source to the gates of each of the plurality of first switches in a non-fault condition, the at least one zener diode being operable to permit a flow of current from the power source to the gates of each of the plurality of switches in response to a voltage of the power source exceeding a zener diode voltage threshold.

12. The system of claim 11, wherein each of the plurality of second fuses is coupled to a resistor operable to provide a decoupling function to prevent each of the plurality of first switches from oscillating due to an input capacitance of the at least one zener diode.

13. A method of providing fault protection, comprising the steps of:
   detecting a fault condition;
   opening a plurality of first switches in response to the fault condition;
   blowing a first fuse coupled to an input of a one of the plurality of switches in response to said one of the plurality of switches not turning OFF;
   blowing a second fuse coupled to a gate of one of the plurality of switches in response to a gate of said one of the plurality of switches being shorted to an input of said one of the plurality of switches;
   orienting at least one zener diode to block a flow of current from the power source from flowing to the gates of each of the plurality of first switches in a non-fault condition; and
   permitting a flow of current from the power source to the gates of each of the plurality of switches to turn on the plurality of switches in response to a voltage of the power source exceeding a zener diode voltage threshold.

14. The method of claim 13, wherein the step of detecting a fault condition comprises:
   measuring a current;
   determining if the current exceeds a current threshold.

15. The method of claim 13, wherein the step of opening a plurality of first switches in response to the fault condition further comprises commanding a driver current OFF, wherein the driver current is coupled to a control input of each of the plurality of first switches.

16. The method of claim 15, wherein the step of opening a plurality of first switches in response to the fault condition further comprises the step of commanding a charge pump OFF, wherein turning the charge pump OFF couples the driver current to a ground connection.

17. An electric system for use on a vehicle comprising:
   a load;
   a first input voltage; and
   at least one circuit breaker, wherein the circuit breaker includes:
      a plurality of first switches providing parallel paths from a power source to the load and being operable to control a flow of current from the power source to the load, each of the first switches having an input, an output, and a gate;
      a controller that is operable to detect a fault condition and to turn OFF the plurality of first switches to prevent the flow of current from the power source to the load in response to the detected fault condition;
      a plurality of first fuses, each first fuse being coupled to an input of an associated one of the plurality of first switches, each of the plurality of first fuses being operable to prevent a flow of current from the power source to the input of its associated switch if a current flowing to the input of its associated switch exceeds a first fuse current threshold; and
      a plurality of second fuses, each second fuse being coupled to a gate of an associated of the plurality of first switches, each of the second plurality of fuses being operable to prevent a flow of current to the gate of its associated switch if the current flowing to the gate of its associated switch exceeds a second fuse current threshold.

18. The system of claim 17, wherein the vehicle is an aircraft.

19. The system of claim 17, further comprising:
   a second input voltage, wherein the circuit breaker further includes:
      a driver that provides a driver current to the plurality of first switches to selectively open and close the plurality of first switches, wherein the second input voltage is coupled to the driver; and
      charge pump that provides a charge pump current to a second plurality of switches to prevent the second plurality of switches from shorting the driver current, wherein the driver and the charge pump are operated by the controller.

20. The system of claim 17, including at least one zener diode oriented to block a flow of current from the power source to the gates of each of the plurality of first switches in a non-fault condition, the at least one zener diode being operable to permit a flow of current from the power source to the gates of each of the plurality of switches in response to a voltage of the power source exceeding a zener diode voltage threshold.

21. The system of claim 20, wherein each of the plurality of second fuses is coupled to a resistor operable to provide a decoupling function to prevent each of the plurality of first switches from oscillating due to an input capacitance of the at least one zener diode.

* * * * *